United States Patent [19]

Callaway

[11] 3,805,164

[45] Apr. 16, 1974

[54] TELEVISION PREAMPLIFIER

[75] Inventor: Garry R. Callaway, Indian Harbor Beach, Fla.

[73] Assignee: 2-Bit Corporation, Melbourne, Fla.

[22] Filed: July 5, 1972

[21] Appl. No.: 269,208

[52] U.S. Cl. ........................ 325/373, 330/18, 330/70

[51] Int. Cl. ............................................. H04b 1/16

[58] Field of Search ......... 330/18, 70; 325/373, 308

[56] References Cited

UNITED STATES PATENTS

| | | | |
|---|---|---|---|
| 3,351,865 | 11/1967 | Dow et al. | 330/18 |
| 3,660,772 | 5/1972 | Holt | 330/18 |
| 3,582,800 | 6/1971 | Lehmann | 330/70 |
| 3,286,189 | 11/1966 | Mitchell et al. | 330/70 |
| 2,881,265 | 4/1959 | Swierczak | 330/70 |

FOREIGN PATENTS OR APPLICATIONS

| | | | |
|---|---|---|---|
| 591,115 | 1/1960 | Canada | 330/70 |

*Primary Examiner*—Albert J. Mayer
*Attorney, Agent, or Firm*—LeBlanc & Shur

[57] ABSTRACT

Disclosed is a broadband amplifier particularly adapted for use as a television VHF preamplifier in marginal television reception areas. It includes two RF type transistors connected in cascode for both DC and RF. A third transistor is used as a DC current source to provide a stable constant collector current for the RF transistors. The amplifier features low noise and low intermodulation distortion.

11 Claims, 2 Drawing Figures

TELEVISION PREAMPLIFIER

Figure 1:
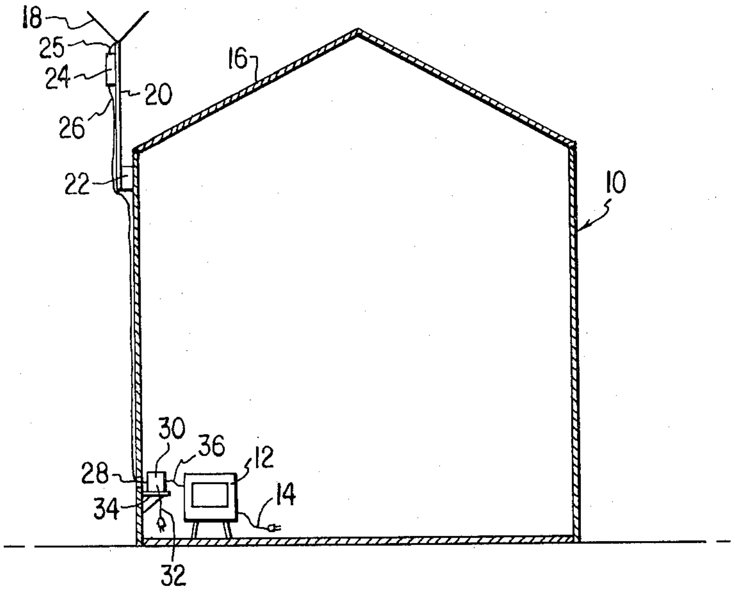

The present invention is directed to a broadband amplifier particularly adapted for use as a television VHF preamplifier for use with marginal television reception in broadcast fringe areas. The amplifier features low noise and low intermodulation distortion.

Television preamplifiers are well known and are normally used to overcome marginal television reception in broadcast fringe areas. These amplifiers are normally mounted outdoors as close as possible to a T.V. antenna and are used to amplify the RF signals received by the antenna and supplied to a television receiver to which the antenna is connected. The amplifier "boosts" the received RF so as to create a signal adequate for a viewing on a conventional T.V. receiver in those areas where the received broadcasts may otherwise have insufficient power for adequate viewing.

Difficulties have been encountered in the past in constructing a T.V. preamplifier having good amplifying characteristics, particularly because of the broadband nature of the signals received. For example, the standard VHF channels 2 through 13 of a T.V. receiver are not all contiguous in frequency and cover a total frequency range from 54 MHz to 216 MHz. In the past it has not been possible to obtain such broadband amplification in a simple and inexpensive construction while at the same time maintaining other desirable amplifier features including a low noise figure, high dynamic range, good input/output match, high gain, and a flat gain response over the entire specified frequency range.

The present invention overcomes these and other difficulties by providing a simplified and inexpensive amplifier utilizing only three conventional transistors. In the amplifiers of this invention two RF type transistors are connected in cascode for both DC and RF. The first stage is connected common emitter while the second stage is connected in a common base configuration. A third transistor is used as a DC current source to provide a stable constant collector current for the two RF transistors. This allows the emitter of the first stage to be connected directly to chassis ground, eliminating the problems normally associated with RF bypassing an emitter resistor.

The broadband amplifier of the present invention features low noise and low intermodulation distortion and is preferably packaged in a rugged weather proof housing for continuous reliable service. The unit amplifies the entire frequency spectrum from T.V. channel 2 through 13 and in addition to use as a VHF preamplifier may be used to amplify FM, airport frequencies, two meter ham-band, police and marine VHF band signals.

It is therefore one object of the present invention to provide and improve broadband amplifier.

Another object of the present invention is to provide an improved broadband amplifier featuring low noise and low intermodulation distortion.

Another object of the present invention is to provide a preamplifier for amplifying T.V. signals in the entire frequency spectrum from T.V. channel 2 through T.V. channel 13.

Another object of the present invention is to provide a relatively simplified and inexpensive amplifier incorporating a low noise figure, high dynamic range, good input/output match, high gain and a flat gain response over a wide frequency band.

Another object of the present invention is to provide a wideband amplifier incorporating two RF type transistors connected in cascode for both DC and RF.

Another object of the present invention is to provide a wideband amplifier including cascode connected transistors in combination with an improved biasing arrangement.

Another object of the present invention is to provide a wideband amplifier incorporating a pair of cascode connected transistors in combination with a third transistor used as a DC current source.

Another object of the present invention is to provide an MATV or CATV preamplifier particularly adapted for use with a remote DC power source.

Figure 2:
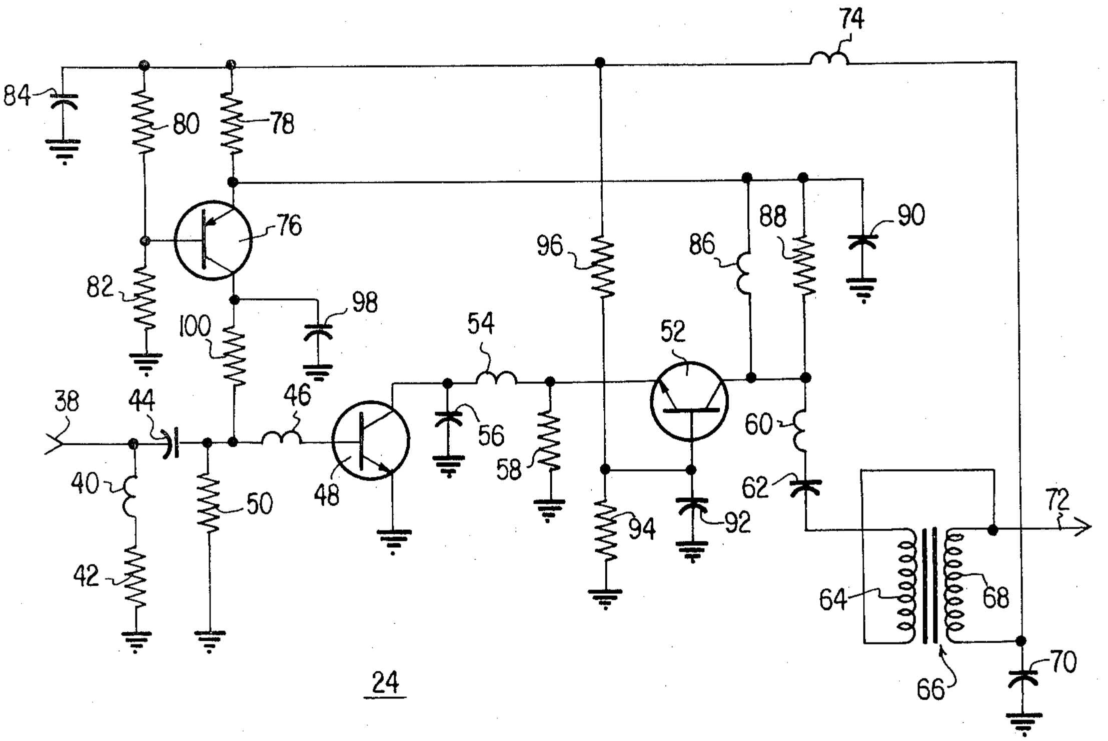

These and further objects and advantages of the invention will be more apparent upon reference to the following specification, claims and apended drawings wherein:

FIG. 1 is a simplified schematic diagram showing the preamplifier of the present invention as incorporated in a T.V. receiving system for use in improving marginal television reception in a broadcast fringe area; and FIG. 2 is a detailed circuit diagram of the preamplifier illustrated in FIG. 1.

Referring to the drawings, FIG. 1 is a simplified diagram of the system of the present invention illustrating at 10 a building which may for example, be a conventional house or an apartment building in which are located one or more conventional television receivers of the type illustrated at 12. Television receiver 12 is illustrated as provided with a conventional cord and plug 14 for the application of power from a standard 117 volt 60Hz power outlet.

Located externally of building 10 near roof 16 is a conventional television receiving antenna 18. Antenna 18 is supported by mast 20 which by way of example only may be mounted on the building 10 by way of a suitable mounting bracket assembly generally indicated at 22.

In order to improve television reception from the more remote broadcast stations antenna 18 is electrically connected to a television preamplifier 24 by a short lead 25. For improved reception preamplifier 24 is mounted as close as possible to antenna 18 and may be connected to mast 20 by any suitable means such as by U-bolts or the like to receive mechanical support from the antenna mast. The RF output from preamplifier 24 is by way of coaxial drop cable 26 which conveniently may follow mast 20 and the side of building 10 where it enters into the building as at 28 for application of the RF T.V. signals to television receiver 12 located inside building 10.

Application of the RF signals from cable 26 to television receiver 12 is by way of preamplifier power supply 30 illustrated as provided with a conventional cord and plug 32 for receiving power from a conventional household 117 volt 60Hz outlet. Power supply 30 may be mounted inside building 10 in any conventional manner such as by a shelf generally indicated at 34 but in any event is preferably located near television receiver 12 where a second AC outlet is most likely to be readily available. Power supply 30 is connected to the RF input of television receiver 12 by way of a short length of coaxial cable 36.

FIG. 2 is a detailed circuit diagram of the preamplifier 24 of FIG. 1. Referring to FIG. 2 the amplifier is provided with an input terminal 38 adapted to receive an RF signal in the VHF band from antenna 18. As previously indicated lead 25 connecting the antenna to the amplifier should be as short as possible. connected cross input terminal 38 is an inductor 40 and a resistor 42. A series circuit comprising a capacitor 44 and an inductor 46 connects the input terminal 38 to the base of the first stage RF transistor 48 (Q2). Connected to the other terminal of the input, i.e., ground, is a shunt resistor 50. The first RF stage or cascode connected transistor 48 is connected to a second stage transistor 52 (Q3) through an inductor 54, a shunt capacitor 56 and a shunt resistor 58. The output from transistor 52, i.e., from its collector, is by way of inductor 60 and a capacitor 62 to the primary 64 an output transformer 66. The secondary 68 of the transformer is connected to an RF bypass capacitor 70 and an RF output signal is developed on lead 72 connected to the other end of the transformer secondary.

RF output lead 72 also receives +24 volt DC electrical energy from a remote power supply and feeds this DC electrical energy by way of the secondary of the transformer and inductor 74 to a biasing transistor 76 (Q1). Transistor 76 in conjunction with resistors 78 and 80 and 82 form a constant current source. Capacitor 84 is connected across resistors 80 and 82.

The emitter of transistor 76 is connected to second stage transistor 52 by inductor 86 and resistor 88 which in turn, each have one end connected to ground through capacitor 90. The base of transistor 52 is connected to the ground through capacitor 92 and resistor 94 and to the biasing circuit through resistor 96. Finally the collector of bias transistor 76 (Q1) is connected to ground through a capacitor 98 and to the junction of capacitor 44 and inductor 46 through resistor 100.

In operation, resistors 78, 80 and 82 in combination with transistor 76 (Q1) form a constant current source for transistors 48 (Q2) and 52 (Q3). The constant current through resistor 78 is divided between the collector of transistor 52 and the base of the first stage transistor 48. If the current in second stage transistor 52 tries to increase it decreases the base drive current to first stage transistor 48 which results in a decrease in the current required at the collector of transistor 52, resulting in a stable bias current.

Capacitor 44 and inductor 46 form a series tuned input matching circuit. Resistor 42 and inductor 40 provide a low frequency loading to the input terminal 38 to help flatten the input match and gain response. Resistor 50 is used to nullify any changes in bias due to collector-to-base leakage current and thus avoids thermal run-away problems. Resistor 100 and capacitor 98 are used as RF decoupling between transistors 76 and 48. Resistor 100 also helps decrease the power dissipation in transistor 76.

Inductor 54 which represents the lead inductance between transistors 48 and 52 and capacitor 56 are used for high frequency peaking. Resistor 58 is used to bleed off some of the current through transistor 52 in order to decrease the current in the first stage 48 and thus improve the noise figure of that stage. Resistors 94 and 96 provide a base bias voltage for transistor 52. Inductors 60 and 86 and capacitor 62 along with the internal collector capacitance of transistor 52 make up a two pole bandpass output filter. Resistor 88 along with the output resistance of transistor 52 provide the correct resistance termination for the output filter. Transformer 66 is a four-to-one impedance transformer to convert the 75 ohm output impedance of the amplifier to 300 ohms. By increasing the impedance seen by the two pole output filter it is possible to construct the filter at an impedance level where the component values can be readily realized. Capacitors 70 and 92 are bypass capacitors.

Capacitor 84 and inductor 74 are for decoupling the DC line. DC power to the preamplifier 24 is provided by the external power source 30 of FIG. 1 connected to the RF output terminal 72. The power source supplies +24 volts DC at approximately 50 milliamperes and by way of example only the power source 30 of FIG. 1 connected by coaxial drop cable 22 to terminal 72 of FIG. 2 may be of the type more fully shown and described in assignees copending application Ser. No. 269,208 filed July 5, 1972. The DC current from the remote power supply on terminal 72 passes through the secondary 68 of transformer 66 and by way of inductor 74 to the bias circuit including transistor 76 (Q1). The amplifier 24 draws approximately 50 milliamperes at +24 volts DC.

As previously indicated, transistor 76 performs as a DC bias feedback circuit to control the current through transistors 48 and 52 to an almost constant value. Transistors 48 and 52 are connected in cascode both for RF and DC. Transistor 52 is biased with a voltage divider (resistors 94 and 96), and resistor 58 plus transistor 48 supplies an additive current sink. The PNP transistor 76 (Q1) is base-biased by resistors 80 and 82. Current through resistor 78 is split between the collector of transistor 52 and the emitter of transistor 76. The collector of transistor 76 supplies base current to transistor 48. Whereas the base current of transistor 48 is amplified to the collector current of transistors 48 and 52, current is increased through transistor 52. Increased current demanded by transistor 52 is substracted from transistor 76 and therefore from the base of transistor 48. Decreasing base current on transistor 48 causes a decrease in collector current of both transistors 48 and 52.

This self controlling feature stabilizes the collector currents of both transistors 48 and 52. Normal stabilizing techniques would call for a resistor connected to the emitter of transistor 48 for current regulation. However, it is difficult to find a RF bypass capacitor that would perform well over wide frequency bandwidths. The circuit illustrated eliminates this problem by allowing the emitter of transistor 48 to be directly grounded while still being DC stable. The result is improved stability, gain bandwidth product and input/output match.

While RF cascode amplifiers, DC cascode amplifiers, and constant current biasing without an emitter resistor are individually known, combining these in the single circuit of the present invention makes possible a unique broadband RF amplifier giving good output to input isolation and improved stability. The amplifier also possess higher dynamic range than competitive constructions through the use of high level transistors while still maintaining a good noise figure.

It is apparent from the above that the present invention provides an improved preamplifier for use in master antenna television systems (MATV), community antenna television systems (CATV) and other areas where television reception might otherwise be borderline. While described in conjunction with use in the VHF television band, the amplifier of the present invention finds wide utility and may be used for other types of RF signal reception where the frequency falls within this band such as the two meter hamband, marine FM band and commercial FM band. Important features of the invention include both DC and RF cascode connections for a pair of high level transistors and a third transistor used as a DC current source to provide a stable constant collector current for the RF transistors thus allowing the emitter of the first stage to be connected directly to the ground and eliminating the problems normally associated with RF bypassing an emitter resistor.

By way of example only, in one embodiemnt of the amplifier constructed in accordance with the present invention the frequency passband was 54 to 216 MHz with a gain of 20 db minimum. The noise figure was typically 4.5 db with an input/output impedance of 75 ohms and a bandpass flatness of ± 1 db. The amplifier was driven from a remote indoor power supply drawing approximately five watts at 117 volts 60Hz. It was powered through a conventional 75 ohm impedance coaxial drop cable from the remote power supply. Transistors 48 and 52 were of the high level type such as those identified as 2N5943 and transistor 76 was a 2N4403.

The invention may be embodied in other specific forms without departing from the spirit or essential characterisitcs thereof. The present embodiment is therefore to be considered in all respect as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A broadband amplifier for energization from a remote power supply comprising RF input and output terminals, first and second stage transistors connected in cascode for both RF and DC between said terminals, a biasing transistor, a DC current path coupling said RF output terminal to said biasing transistor, each of said first and second stage transistors having an emitter, collector and base, and means connecting the emitter of said first stage transistor directly to circuit common.

2. An amplifier according to claim 1 wherein said biasing transistor is coupled to the base of said first stage transistor and to the collector of said second stage transistor.

3. An amplifier according to claim 1 wherein said first stage transistor is connected common emitter and said second stage transistor is connected common base.

4. An amplifier according to claim 3 wherein said first and second stage transistors are high level transistors.

5. An amplifier according to claim 2 wherein said biasing transistor includes an emitter, collector and base, the emitter of said biasing transistor being coupled to the collector of said second stage transistor and the collector of said biasing transistor being coupled to the base of said first stage transistor.

6. A broadband amplifier comprising RF input and output terminals, first and second stage transistors connected in cascode for both RF and DC between said terminals, each of said first and second stage transistors having an emitter, collector and base, said first stage transistor being connected common emitter and said second stage transistor being connected common base, a constant current source biasing transistor coupled to said first and second stage transistors, and means connecting the emitter of said first stage transistor directly to circuit common.

7. An amplifier according to claim 6 wherein said RF input terminal is coupled to the base of said first stage transistor.

8. An amplifier according to claim 7 including a current bleed off resistor coupled to the emitter of said second stage transistor.

9. An amplifier according to claim 7 including a remote power source coupled to said RF output terminal.

10. An amplifier according to claim 9 including a T.V. receiver coupled to said RF output terminal.

11. An amplifier according to claim 10 including a T.V. antenna coupled to said RF input terminal, and a mast supporting said antenna, said amplifier being mounted on said mast adjacent said antenna.

* * * * *

FO-1050
(5/69)

UNITED STATES PATENT OFFICE

CERTIFICATE OF CORRECTION

Patent No. 3,805,164 Dated April 16, 1974

Inventor(s) Gary R. Callaway

It is certified that error appears in the above-identified patent and that said Letters Patent are hereby corrected as shown below:

The name of the inventor should read --Gary R. Callaway--.

The name of the assignee should read --Q-bit Corporation--.

In Column 3, line 6, "connected" should read --Connected--.

Signed and sealed this 22nd day of October 1974.

(SEAL)
Attest:

McCOY M. GIBSON JR.
Attesting Officer

C. MARSHALL DANN
Commissioner of Patents